(12) United States Patent
Orange et al.

(10) Patent No.: US 10,584,241 B2
(45) Date of Patent: Mar. 10, 2020

(54) THERMOPLASTIC COMPOSITION HAVING HIGH FLUIDITY

(71) Applicant: RHODIA OPERATIONS, Paris (FR)

(72) Inventors: Gilles Orange, Vourles (FR); Didier Tupinier, Assieu (FR)

(73) Assignee: RHODIA OPERATIONS, Paris (FR)

( * ) Notice: Subject to any disclaimer, the term of this patent is extended or adjusted under 35 U.S.C. 154(b) by 265 days.

(21) Appl. No.: 15/534,829

(22) PCT Filed: Dec. 21, 2015

(86) PCT No.: PCT/EP2015/080818
§ 371 (c)(1),
(2) Date: Jun. 9, 2017

(87) PCT Pub. No.: WO2016/102481
PCT Pub. Date: Jun. 30, 2016

(65) Prior Publication Data
US 2017/0342267 A1    Nov. 30, 2017

(30) Foreign Application Priority Data
Dec. 22, 2014    (FR) ...................................... 14 63108

(51) Int. Cl.
| | |
|---|---|
| *C08L 77/06* | (2006.01) |
| *B29C 70/52* | (2006.01) |
| *B29C 70/48* | (2006.01) |
| *C08L 77/02* | (2006.01) |
| *C08J 5/04* | (2006.01) |
| *C08J 5/24* | (2006.01) |
| *B29K 77/00* | (2006.01) |
| *B29K 105/06* | (2006.01) |

(52) U.S. Cl.
CPC .............. *C08L 77/06* (2013.01); *B29C 70/48* (2013.01); *B29C 70/52* (2013.01); *C08J 5/04* (2013.01); *C08J 5/043* (2013.01); *C08J 5/24* (2013.01); *C08L 77/02* (2013.01); *B29K 2077/00* (2013.01); *B29K 2105/06* (2013.01); *C08J 2377/02* (2013.01); *C08J 2377/06* (2013.01); *C08J 2461/06* (2013.01); *C08J 2461/10* (2013.01); *C08J 2467/02* (2013.01); *C08J 2471/02* (2013.01); *C08L 2205/04* (2013.01); *C08L 2205/06* (2013.01)

(58) Field of Classification Search
CPC .......................... C08J 2377/02; C08J 2377/06
See application file for complete search history.

(56) References Cited

U.S. PATENT DOCUMENTS

| 10,077,335 B2 | 9/2018 | Matsumoto et al. |
| 2004/0044141 A1 | 3/2004 | McGrail et al. |
| 2010/0227962 A1 | 9/2010 | Vergelati et al. |
| 2012/0264864 A1 | 10/2012 | Vergelati et al. |
| 2012/0322326 A1 | 12/2012 | Orange |
| 2013/0165565 A1 | 6/2013 | Yao |
| 2015/0048539 A1 | 2/2015 | Mitadera |
| 2015/0336338 A1 | 11/2015 | Bordere et al. |

FOREIGN PATENT DOCUMENTS

| JP | 2011500875 A | 1/2011 |
| RU | 2129134 C1 | 4/1999 |
| RU | 2480497 C1 | 4/2013 |
| SU | 737413 A1 | 5/1980 |
| WO | 2011003786 A1 | 1/2011 |
| WO | 2013190224 A1 | 12/2013 |
| WO | 2014050303 A1 | 4/2014 |
| WO | 2014121842 A1 | 8/2014 |

*Primary Examiner* — James Sanders
(74) *Attorney, Agent, or Firm* — Thi Dang

(57) ABSTRACT

The invention concerns a thermoplastic composition having high fluidity in the molten state, comprising at least:
  (a) one thermoplastic polymer matrix;
  (b) one oligomer selected from cyclic ester oligomers, ether oligomers and mixtures thereof, said oligomer having a degree of polymerization of between 2 and 25; and
  (c) one phenolic polymer;
  said compounds (b) and (c) being present in a weight ratio (c)/(b) varying from 0.25 to 6, and preferably from approximately 0.75 to 2.75.

The invention also concerns a process for producing a composite article from such a composition by impregnating a reinforcement such as a fabric or a preform, the composite article obtained according to this process, and the use of an oligomer (b) in combination with at least one phenolic polymer (c), as a plasticizing additive in a thermoplastic polymer matrix.

12 Claims, No Drawings

THERMOPLASTIC COMPOSITION HAVING HIGH FLUIDITY

CROSS-REFERENCE TO RELATED APPLICATIONS

The present application is a U.S. national phase entry under 35 U.S.C. § 371 of International Application No. PCT/EP2015/080818, filed on 21 Dec. 2015, which claims priority to French Application No. 1463108, filed on 22 Dec. 2014. The entire content of each of these applications is explicitly incorporated herein by reference.

The present invention concerns the field of composite materials, produced via the impregnation of a fabric (reinforcing material) with at least one thermoplastic polymer in the molten state, in particular a polyamide, and the process for producing same.

Composite materials comprising a thermoplastic matrix today constitute high-performance materials for mass-market industries such as land transport (motor vehicles, etc.), energy, sports and leisure, and agricultural machinery or civil engineering machinery, or more limited but developing markets such as aeronautics. They in fact have good intrinsic mechanical performance levels, in particular ductility, impact resistance, good chemical stability, in particular with respect to solvents, and total recyclability.

Among the processes for producing composite structures, mention will be made of processes using semi-products (prepreg, sheets, tapes), such as stamping and overmolding, filament winding or positioning of fibers or tapes, and direct processes such as liquid composite molding (LCM) or continuous processes such as pultrusion-injection.

Unfortunately, in the case of thermoplastic-based composites, a limiting constraint in terms of the process is the degree of impregnation of the fibrous reinforcement by the polymer in the molten state.

Various solutions have been developed over the past few years, in particular either by using oligomers and/or monomers with in situ polymerization after impregnation of the reinforcement, or by using polymers having high fluidity.

Thus, the development of new thermoplastic polymers with low melt viscosity has made it possible to obtain better impregnation of fibrous reinforcements (increase in the amount of fibers, reduction in process cycle times).

Nevertheless, the still high level of viscosity of these polymers imposes limits.

It has been observed, unexpectedly, that the combined use of two specific compounds makes it possible to very significantly reduce the melt viscosity of thermoplastic polymers, in particular of polyamide type.

Thus, according to one of its aspects, the present invention concerns a thermoplastic composition having high fluidity in the molten state, comprising at least:
(a) one thermoplastic polymer matrix;
(b) one oligomer selected from cyclic ester oligomers, ether oligomers and mixtures thereof; and
(c) one phenolic polymer;
said compounds (b) and (c) being present in a weight ratio (c)/(b) varying from 0.25 to 6, and preferably from approximately 0.75 to 2.75.

In the present text, the term "thermoplastic polymer matrix" is used to denote a single thermoplastic polymer or a blend of thermoplastic polymers.

For the purposes of the invention, the term "thermoplastic polymer matrix" is intended to mean a thermoplastic polymer, or a blend of thermoplastic polymers.

For the purposes of the invention, the term "thermoplastic polymer" is intended to mean any polymer which has a melting point of less than or equal to 325° C.

Admittedly, the addition of an antiplasticizer of phenolic polymer type to a polyamide has already been described for example in applications WO 2011/048055 A1, WO 2009/037276 A1 and WO 2011/003786 A1, in particular for the purposes of increasing the fluidity of the polyamide in the molten state.

The addition of a plasticizer of oligomer type, selected from cyclic ester oligomers and ether oligomers, to polyamides is also disclosed, in particular in application WO 2013/190224 A1. However, these oligomers generate a limited reduction in the melt viscosity of the polyamide and may cause an impairment of its properties, for instance a modification of its glass transition temperature Tg or of the interfacial fiber-matrix cohesion during the production of a composite material from a polymer that has been added to in this way.

To the knowledge of the inventors, the combination of these two compounds with a thermoplastic matrix is not known at the current time.

Unexpectedly, the inventors have thus discovered that the combined use of an oligomer selected from cyclic ester oligomers, ether oligomers and mixtures thereof, and of an additive of phenolic polymer type makes it possible to very significantly reduce the melt viscosity of the thermoplastic matrix.

The inventors have also noted that the combination of these two additives make it possible to synergistically increase the fluidity in the molten state of the thermoplastic matrix, and in particular when they are introduced in a small amount (from 1% to 10%), without the abovementioned drawbacks.

As emerges in particular from the examples hereinafter, the composition of the invention proves to be advantageous in several respects.

First of all, the use of a thermoplastic composition having high fluidity allows better impregnation of the reinforcing material, and thus faster obtaining of composite articles which also have a low porosity. The use of such a composition also makes it possible to produce articles with a high fiber content.

In addition, the low viscosity of the composition of the invention, in particular when it is less than 25 Pa·s, makes it possible to produce composite articles according to a direct process of LCM or pultrusion type, in particular pultrusion-injection type, that is to say at a rate compatible with industry needs.

According to another of its aspects, the present invention is directed toward a process for producing a composite article, comprising at least one step of impregnating a reinforcing fabric or a preform with a composition according to the invention in the molten state.

According to this aspect, the process may be a pultrusion process, preferably by direct injection, or an RTM process by closed-molding injection.

According to yet another of its aspects, the invention concerns a composite article obtained by means of the process as defined above.

Another subject of the invention is the use of an oligomer (b) selected from cyclic ester oligomers or ether oligomers and mixtures thereof, in combination with at least one phenolic polymer (c), as a plasticizing additive in a thermoplastic polymer matrix.

According to one implementation variant, said compounds (b) and (c) used as plasticizing additive in a thermoplastic polymer matrix are brought into contact in a weight ratio (c)/(b) varying from 0.25 to 6, and preferably from approximately 0.75 to 2.75.

Advantageously, the amount of compounds (b) and (c) is adjusted so as to reduce the melt viscosity of said matrix to a value of less than 75 Pa·s and preferably less than 50 Pa·s, or even less than or equal to 20 Pa·s.

In the context of the present invention, all the viscosities expressed in the molten state are measured using a cone-plate rheometer 25 mm in diameter, under nitrogen, and under a stepwise shear sweep ranging from $10^{-1}$ to $10^2$ s$^{-1}$ at 100% strain in dynamic mode with a continuous frequency sweep and isothermal conditions. Except in the case mentioned below, this measurement is carried out at a temperature ranging from 20° C. to 30° C. above the melting point (Mp) of the material in question if it is semi-crystalline, and at a temperature T ranging from 80° C. to 200° C., or even from 100° C. to 200° C., above its glass transition temperature (Tg) if it is amorphous (with T<325° C.), for a frequency of 10 Hz.

To do this, the material in question is introduced in the dry state (RH=0, RH for relative humidity), in the form of granules or ground powder, between the plates of the rheometer, and then melted, so as to form a liquid film 50 μm thick on which the measurement is then carried out.

In the particular case where the viscosity measurement relates to a composition comprising a thermoplastic polymer matrix, and in particular a composition according to the invention, it is carried out at a temperature ranging from 20° C. to 30° C. above the melting point (Mp) of the polymer matrix (a) if it is semi-crystalline, and at a temperature ranging from 80° C. to 200° C. above its glass transition temperature (Tg) if it is amorphous.

When the viscosity measurement relates to a composition according to the invention, it is carried out on a homogeneous mixture of this composition.

For the purposes of the invention, the term "homogeneous" describes a composition or mixture in which the compounds (a), (b) and (c) according to the invention are uniformly distributed. The same melt viscosity value is thus guaranteed at any point in the mixture.

Thermoplastic Polymer Matrix

As previously indicated, a composition according to the invention comprises at least one thermoplastic polymer matrix.

The thermoplastic polymers suitable for use in the present invention may be selected from:
  polyethylenimines (PEIs);
  polyimides (PIs);
  thermoplastic polyurethanes (TPUs);
  polyesters; polyethylene terephthalates (PETs) or polybutylene terephthalates (PBTs);
  polyphenylene sulfides (PPSs);
  polyaryl ether ketones (PAEKs) such as polyether ether ketone (PEEK) and polyether ketone ketone (PEKK);
  aliphatic polyamides (Pas), and semi-aromatic polyamides (PPAs), some of these polymers being sold by the company Solvay under the names Technyl and Amodel;
  fluoropolymers comprising at least one monomer having the following formula (I): CFX=CHX' (I), wherein X and X' independently denote a hydrogen or halogen atom (in particular a fluorine or chlorine atom) or a perhalogenated (in particular perfluorinated) alkyl radical, and preferably X=F and X—H, such as poly (vinylidene fluoride) (PVDF), preferably in form a, copolymers of vinylidene fluoride with for example hexafluoropropylene (HFP), fluoroethylene/propylene (FEP) copolymers, copolymers of ethylene with either fluoroethylene/propylene (FEP), or tetrafluoroethylene (TFE), or perfluoromethylvinyl ether (PMVE), or chlorotrifluoroethylene (CTFE), some of these polymers being in particular sold by the company Solvay under the name Solef; and
  blends thereof.

Preferably, the thermoplastic matrix of the invention has a melt viscosity ranging from 1 to 200 Pa·s, in particular from 1 to 75 Pa·s, and more preferentially from 5 to 50 Pa·s.

According to one embodiment of the invention, the thermoplastic polymer matrix comprises at least one polyamide, and it preferably consists of polyamide(s).

The polyamides suitable for use in the invention may in particular be aliphatic or semi-aromatic, semi-crystalline or amorphous.

The polymerization of the polyamide of the invention is in particular carried out according to standard polyamide polymerization operating conditions, continuously or batchwise.

More particularly, polyamides having a number-average molecular weight greater than 5000 g/mol, more preferentially of between 8000 g/mol and 20 000 g/mol, or else a mixture of polyamides of different molecular weights, having sufficient mechanical properties and a degree of hold during the various forming processes, are suitable for use in the invention.

The weight-average molecular weight Mw of the polyamides that may be suitable for use in the invention may be between 10 000 and 50 000 g/mol, preferentially between 12 000 and 30 000 g/mol.

It should be noted that the molecular weights which appear with regard to these polymers are essentially presented by way of indication of a weight scale. It should be noted that a specific molecular weight may be determined in many ways which are well known per se to those skilled in the art.

By way of illustration of these methods, mention may in particular be made of that which is based on an analysis of the end groups, and in particular that which calls upon a measurement using gel permeation chromatography (GPC), also known as size exclusion chromatography (SEC). In general, the GPC measurements of a polyamide may be carried out in dichloromethane (solvent and eluent), after chemical modification of the polyamide in order to solubilize it. A UV detector is used because the chemically modified polyamide has a UV chromophore. The calculation of the distribution of weights and also the average weights Mn and Mw may be carried out in polystyrene equivalents (PST) or absolute weight, after calibration using commercial standards. If necessary, absolute-weight measurements may be carried out by viscometric detection. In the context of the present invention, the average molecular weights Mn and Mw are expressed in absolute weight. The Mn and Mw values may be calculated from the entire distribution or after truncation of the low weights if it is not desired to take into account the contribution of the cyclic oligomers.

The polyamides may be selected in particular from the group consisting of polyamides obtained by polycondensation of at least one aliphatic dicarboxylic acid with an aliphatic or cyclic diamine or between at least one aromatic dicarboxylic acid and an aliphatic or aromatic diamine, polyamides obtained by polycondensation of at least one amino acid or lactam with itself, or blends thereof and (co)polyamides.

More specifically, these copolyamides may be, for example, poly(hexamethylene adipamide), polyphthalamides obtained from terephthalic and/or isophthalic acid, or copolyamides obtained from adipic acid, hexamethylenediamine and caprolactam.

The polyamide of the invention may in particular be selected from the group consisting of polyamides obtained by polycondensation of at least one aliphatic dicarboxylic acid with an aliphatic or cyclic diamine, such as PA 66, PA 6.10, PA 6.12, PA 12.12, PA 4.6 or MXD 6, or between at least one aromatic dicarboxylic acid and an aliphatic or aromatic diamine, such as polyterephthalamides, polyisophthalamides or polyaramids, or a blend thereof and (co)polyamides. The polyamide of the invention may also be selected from polyamides obtained by polycondensation of at least one amino acid or lactam with itself, it being possible for the amino acid to be generated by hydrolytic opening of a lactam ring, such as, for example, PA 6, PA 7, PA 10T, PA 11 or PA 12, or a blend thereof and (co)polyamides thereof.

By way of polyamides that are suitable for use in the present invention, mention may in particular be made of PA 6, PA 7, PA 10, PA 11, PA 12, PA 46, PA 66, PA 69, PA 610, PA 612, PA 9T, PA 10T, PA 4.6, PA 6.10, PA 6.12, PA 12.12, PA 6.66, MXD 6, PA 6TXT, PA 66/6T, PA 66/6I, PA6T/6I and PA 6T/6I/66.

Mention may in particular be made of PA 66 22FE1 sold by Solvay under the name Stabamid.

The composition of the invention may also comprise copolyamides derived in particular from the above polyamides, or the blends of these polyamides or copolyamides.

Preferably, the polyamides are selected from PA 66, PA 6.10, PA 6.12, PA 12.12, PA 4.6, MXD 6, PA 6, PA 7, PA 9T, PA 10T, PA 11, PA 12, PA 6T/6I, PA 6T/6I/66, copolyamides deriving therefrom, and blends thereof.

The polyamide may in particular be a polymer comprising star or H macromolecular chains, a branched or hyperbranched polymer, and, if appropriate, a polymer comprising linear macromolecular chains. The polymers comprising such star or H macromolecular chains are, for example, described in the documents FR 2 743 077, FR 2 779 730, U.S. Pat. No. 5,959, 069, EP 0 632 703, EP 0 682 057 and EP 0 832 149.

Polyamides with a star structure are known to exhibit an improved melt flow in comparison with linear polyamides. The star macromolecular chains comprise a core and at least three polyamide branches. The branches are bonded to the core by a covalent bond, via an amide group or a group of another nature. The core is an organic or organometallic chemical compound, preferably a hydrocarbon compound optionally comprising heteroatoms and to which the branches are connected. The branches are polyamide chains. The polyamide chains constituting the branches are preferably of the type of those obtained by polymerization of lactams or amino acids, for example of polyamide-6 type. The polyamide possessing a star structure according to the invention optionally comprises, in addition to the star chains, linear polyamide chains. In this case, the ratio by weight of the amount of star chains to the sum of the amounts of star chains and of linear chains is between 0.5 and 1, limits included. It is preferably between 0.6 and 0.9.

According to one preferred embodiment of the invention, the polyamide possessing a star structure, that is to say comprising star macromolecular chains, is obtained by copolymerization of a mixture of monomers comprising at least:

a) monomers of following general formula (I):

b) monomers of following general formulae (Ma) and (Mb):

c) optionally monomers of following general formula (III) or (IV):

wherein:
$R_1$ is a linear or cyclic and aromatic or aliphatic hydrocarbon radical comprising at least 2 carbon atoms possibly comprising heteroatoms;
A is a covalent bond or an aliphatic hydrocarbon radical which can comprise heteroatoms and which comprises from 1 to 20 carbon atoms;
Z represents a primary amine function or a carboxylic acid function;
Y is a primary amine function when X represents a carboxylic acid function or Y is a carboxylic acid function when X represents a primary amine function;
$R_2$, $R_3$ and $R_4$, which are identical or different, represent substituted or unsubstituted and aliphatic, cycloaliphatic or aromatic hydrocarbon radicals comprising from 2 to 20 carbon atoms possibly comprising heteroatoms; and
m represents an integer between 3 and 8.

Carboxylic acid is intended to mean carboxylic acids and their derivatives, such as acid anhydrides, acid chlorides or esters.

Processes for producing these star polyamides are described in the documents FR 2 743 077 and FR 2 779 730. These processes result in the formation of star macromolecular chains, as a mixture with, optionally, linear macromolecular chains. If a comonomer of formula (III) is used, the polymerization reaction is advantageously carried out until thermodynamic equilibrium is reached.

The monomer of formula (I) may also be blended with a molten polymer during an extrusion operation.

Thus, according to another embodiment of the invention, the polyamide possessing a star structure is obtained by melt blending, for example using an extrusion device, a polyamide of the type of those obtained by polymerization of lactams and/or amino acids and a monomer of formula (I). Such production processes are described in patents EP 0 682 070 and EP 0 672 703.

According to one particular characteristic of the invention, the $R_1$ radical is either a cycloaliphatic radical, such as the tetravalent cyclohexanonyl radical, or a 1,1,1-propanetriyl or 1,2,3-propanetriyl radical. Mention may be made, as other $R_1$ radicals that are suitable for use in the invention, of substituted or unsubstituted trivalent phenyl and cyclohexanyl radicals, tetravalent diaminopolymethylene radicals with a number of methylene groups advantageously of between 2 and 12, such as the radical originating from EDTA (ethylenediaminetetraacetic acid), octavalent cyclohexanonyl or cyclohexadinonyl radicals, and the radicals originating from compounds resulting from the reaction of polyols, such as glycol, pentaerythritol, sorbitol or mannitol, with acrylonitrile.

Advantageously, at least two different $R_2$ radicals may be employed in the monomers of formula (II).

The A radical is preferably a methylene or polymethylene radical, such as the ethyl, propyl or butyl radicals, or a polyoxyalkylene radical, such as the polyoxyethylene radical.

According to a specific embodiment of the invention, the number m is greater than or equal to 3 and advantageously equal to 3 or 4. The reactive function of the polyfunctional compound represented by the symbol Z is a function capable of forming an amide function.

Preferably, the compound of formula (I) is selected from 2,2,6,6-tetra-(β-carboxyethyl)cyclohexanone, trimesic acid, 2,4,6-tri(aminocaproic acid)-1,3,5-triazine and 4-aminoethyl-1,8-octanediamine.

The mixture of monomers responsible for the star macromolecular chains may comprise other compounds, such as chain limiters or catalysts. The following compounds are not necessarily part of the mixture of monomers responsible for the star structure, but may be added at synthesis or afterward: additives, such as light stabilizers, heat stabilizers and lubricants.

The polyamide may be a polymer of random tree type, preferably a copolyamide exhibiting a random tree structure. These copolyamides having a random tree structure and their process of production are described in particular in the document WO 99/03909. The composition of the invention may also be a composition comprising a linear thermoplastic polymer and a star, H and/or tree thermoplastic polymer as described above. The composition of the invention may also comprise a hyperbranched copolyamide of the type of those described in document WO 00/68298. The composition of the invention may also comprise any combination of linear, star, H or tree thermoplastic polymer and hyperbranched copolyamide as described above.

Use may also be made of non-evolutive polyamide resins of low molecular weight that may be obtained in various ways, in particular by imbalance of the stoichiometry of the monomers and/or addition of blocking components (these are monofunctional molecules also known as chain limiters, with a concentration of terminal blocking groups (TBGs)) during the polyamide polymerization or polycondensation process, or else by addition of monomers or blocking components in mixing, in particular in extrusion. The weight-average molecular weight Mw of these polyamide resins is between 6000 and 30 000 g/mol, preferentially between 10 000 and 20 000 g/mol. The weight-average molecular weight may be measured according to the techniques mentioned in application WO 2011/073198 A1.

These polyamides have a concentration of terminal amine groups (TAGs) and/or of terminal carboxylic groups (TCGs) of less than or equal to 20 meq/kg.

These resins are termed non-evolutive since no significant increase is observed in their molecular weight, or in the degree of polymerization, when they are used in the production process according to the invention; that is to say under temperature and pressure conditions which normally promote an increase in molecular weight. These resins are in this sense different than the partially polymerized or prepolymerized polymers conventionally used. These polyamide resins preferentially have a concentration of terminal amine groups (TAGs) and/or of terminal carboxylic groups (TCGs) of less than or equal to 20 meq/kg, preferentially less than or equal to 15 meq/kg, more preferentially less than or equal to 10 meq/kg, even more preferentially less than or equal to 5 meq/kg, most particularly equal to 0 meq/kg. A polyamide that is suitable for use in the present invention may thus have, for example, a TAG of 0 meq/kg and a TCG of 500 meq/kg. A polyamide that is suitable for use in the present invention may thus have, for example, a TAG of 400 meq/kg and a TCG of 0 meq/kg. A polyamide which has a concentration of terminal amine groups (TAGs) of less than or equal to 5 meq/kg generally has a concentration of terminal carboxylic groups (TCGs) of between 100 and 1000 meq/kg. A polyamide which has a concentration of terminal carboxylic groups (TCGs) of less than or equal to 5 meq/kg generally has a concentration of terminal amine groups (TAGs) of between 100 and 1000 meq/kg.

Finally, a polyamide of the invention may also have a TAG=400 meq/kg, a TCG of 0 meq/kg and a concentration of terminal blocking groups TBGs=100 meq/kg.

The amounts of terminal amine groups (TAGs) and/or terminal acid groups (TCGs) may be determined by potentiometric assay following complete dissolution of the polyamide, in trifluoroethanol, for example, and addition of a strong base in excess. The basic species are then titrated with an aqueous solution of strong acid.

Such resins according to the invention may be produced in many ways and are well known per se to those skilled in the art.

Such resins may for example be produced by polymerization addition, in particular at the beginning, during or at the end of the polymerization, of the monomers of the polyamide, also in the presence of difunctional and/or monofunctional compounds. These difunctional and/or monofunctional compounds have amine or carboxylic acid functions capable of reacting with the monomers of the polyamide and are used in proportions such that the resulting polyamide resin preferentially has a TAG and/or TCG of less than 20 meq/kg. It is also possible to mix difunctional and/or monofunctional compounds with a polyamide, in particular by extrusion, generally reactive extrusion, so as to obtain the polyamide resin used according to the present invention. It is possible to use any type of aliphatic or aromatic monocarboxylic or dicarboxylic acid or any type of aliphatic or aromatic monoamine or diamine amine. As monofunctional compound, use may in particular be made of n-dodecylamine and 4-amino-2,2,6,6-tetramethylpiperidine, acetic acid, lauric acid, benzylamine, benzoic acid, acetic acid and propionic acid. Use may in particular be made, as difunctional compound, of adipic acid, terephthalic acid, isophthalic acid, sebacic acid, azelaic acid, dodecanedioic acid, decanedioic acid, pimelic acid, suberic acid, fatty acid dimers, di(ethylcarboxy)cyclohexanone, hexamethylenediamine, methyl-5 pentamethylenediamine, meta-xylylenediamine, butanediamine, isophorone diamine, 1,4-diaminocyclohexane and 3,3',5-trimethylhexamethylenediamine. An excess of adipic acid or an excess of hexamethylenediamine may also be used for the production of a polyamide type 66 having a high melt fluidity and a concentration of terminal amine groups (TAGs) and/or of terminal carboxylic groups (TCGs) of preferentially less than 20 meq/kg.

It is also possible to greatly decrease the concentrations of terminal acid or amine groups of a polyamide by performing a finishing under vacuum at the end of polymerization so as to remove the water in order to consume all or virtually all the terminal groups, and thus to guarantee that the resin will not evolve any more in the direction of an increase in molecular weight, in particular under pressure or under vacuum.

It is also possible to use, in the composition of the present invention, non-evolutive blocked polyamide resins of low molecular weight having a number-average molecular weight Mn of less than 8000 g/mol and/or having a concentration of terminal amine groups (TAGs) greater than 25 meq/kg, a concentration of terminal acid groups (TCGs) greater than 25 meq/kg and a concentration of terminal blocked groups (TBGs) included according to the formula 2 000 000/(TAG+TCG+TBG)<8000 g/mol. These polyamides may in particular be produced by adding, during polymerization of the polyamide, various monofunctional or bifunctional monomers.

The polyamide of the invention may also comprise hydroxyaromatic units chemically bonded to the polyamide chain. To do this, use is made of a hydroxyaromatic organic compound which is a compound comprising at least one aromatic hydroxyl group and at least one function capable of chemically bonding to the acid or amine functions of the polyamide, which, once chemically bonded to the polyamide chain, becomes a hydroxyaromatic unit. This compound is preferably selected from the group consisting of: 2-hydroxyterephthalic acid, 5-hydroxyisophthalic acid, 4-hydroxyisophthalic acid, 2,5-dihydroxyterephthalic acid, 4-hydroxyphenylacetic acid or gallic acid, L-tyrosine, 4-hydroxyphenylacetic acid, 3,5-diaminophenol, 5-hydroxy-m-xylylenediamine, 3-aminophenol, 3-amino-4-methylphenol, and 3-hydroxy-5-aminobenzoic acid.

The composition according to the invention preferably exhibits from 60% to 98% by weight of thermoplastic polymer, preferentially from 80% to 95% by weight, relative to the total weight of the composition.

The composition may also comprise, depending on the desired final property, a blend of polyamide and one or more other polymers, optionally in the presence of a compatibilizing agent, such as, for example, another polyamide, polyethylene, polystyrene, ABS resin, polyphenylene sulfide, polyphenylene oxide, polyacetal, polysulfone, polyethersulfone, polyetherimide, polyether ketone, a polysulfone resin, an elastomeric resin or blends thereof.

By way of blend of polyamide that is suitable for use in the present invention, a composition may for example comprise:

(a) a polyamide of number-average molecular weight Mn of greater than or equal to 8000 g/mol, and (b) a non-evolutive polyamide, that is to say a polyamide having a melt viscosity varying at most by 5%, or even at most by 2%, preferably at most by 1%, in particular at most by 0.5%, during a period of at least 30 minutes at constant temperature and pressure under an inert atmosphere; said polyamide (b) having a number-average molecular weight Mn of between 5000 g/mol and 8000 g/mol.

Indeed, the "low weight" polyamide (b) advantageously makes it possible to reduce the melt viscosity of the polyamide blend relative to that of the polyamide (a) alone. In addition, when the polyamide (a) is in large majority in the blend, the mechanical properties of the polyamide (a) are preserved, which is particularly advantageous since they are generally more advantageous than those of a "low weight" polyamide for the intended applications, namely the production of composite materials.

The blend of polyamides (a) and (b) advantageously has a content of polyamide (a) of greater than or equal to 65% by weight, in particular greater than or equal to 80% by weight, relative to the total weight of the blend of polyamides (a) and (b).

Oligomer

As emerges from the aforementioned, the thermoplastic composition of the invention comprises at least one plasticizer of oligomer type selected from cyclic ester oligomers or ether oligomers and mixtures thereof.

For the purposes of the invention, the term "oligomer" is intended to mean a polymeric compound of small size, comprising between 2 and 25 monomers, that is to say the degree of polymerization of which is between 2 and 25.

When the oligomer, or the mixture of oligomers, is selected from cyclic ester oligomers, it is more particularly selected from:

(1) cyclic polyester oligomers such as cyclized poly(butylene terephthalate) (PBT) or mixtures containing same, such as the CBT 100 resin sold by Cyclics Corporation for example;

(2) lactide oligomers, or mixtures containing same;

(3) lactone oligomers, such as for example the ε-caprolactone dimer, or mixtures containing same;

(4) carbonate oligomers and more particularly alkylene carbonate oligomers, such as those selected from ethylene carbonate, propylene carbonate, butylene carbonate and mixtures thereof and mixtures thereof.

Thus, for the purposes of the invention, the term "cyclic ester oligomers" is intended to mean not only ester oligomers, in which said oligomer itself forms a ring, but also ester oligomers formed from cyclic monomers. The ester oligomers, in which said oligomer itself forms a ring and which are formed from cyclic ester monomers, are also part of the invention. In particular, by way of ring-forming oligomers, mention may be made of the oligomers (1) above, and by way of oligomers formed from cyclic monomers, mention may be made of the oligomers (2), (3) and (4) above.

Lactides are cyclic dimers comprising two ester functional groups and are obtained by esterification of lactic acid. Lactides exist as three stereoisomers. When they polymerize above the degree of polymerization equal to 2, they polymerize by ring opening so as to create a lactic acid oligomer or polymer depending on the degree of polymerization.

A lactone is a monomer obtained by esterification and intramolecular cyclization of hydroxy acid. Cyclic dimers or trimers exist, such as the ε-caprolactone dimer. Above this degree of polymerization, the oligomerization involves opening of its ring.

According to one embodiment, the composition of the invention comprises at least cyclized poly(butylene terephthalate) (PBT) as oligomer selected from cyclic ester oligomers or ether oligomers and mixtures thereof.

When the oligomer, or the mixture of oligomers, is selected from ether oligomers, it is more particularly selected from:

ethylene glycol oligomers;
propylene glycol oligomers; and
mixtures thereof.

The ether oligomers, also called polyolefin ether or polyether, are produced from oligomerized ethylene glycol or propylene glycol.

Preferably, the oligomer, or the mixture of oligomers, used has a melting point Mp lower than or equal to the melting point Mp of the thermoplastic polymer matrix and a viscosity lower than that of the thermoplastic matrix in the molten state.

In this respect, it should be noted that the melt viscosity of the oligomer is generally less than or equal to 5 Pa·s, preferably less than or equal to 0.5 Pa·s.

This allows the oligomer to mix correctly and uniformly in the molten thermoplastic matrix.

The oligomers used may be produced from a cyclized or linear component, such as cyclic esters or linear ethers for example.

Advantageously, the oligomers of the invention have a totally crystalline structure, that is to say that their molecules are ordered in an organized and compact arrangement. Such a crystalline structure has a high melt fluidity, which makes it possible to further decrease the melt viscosity of the composition according to the invention. By way of example, the CBT 100 resin and the polycarbonate oligomer are 100% crystalline.

Preferably, the oligomer, or the mixture of oligomers, is present in the composition according to the invention in a content ranging from 1% to 10% by weight, preferably from 2% to 10% by weight and preferably from 3% to 8% by weight, relative to the total weight of the composition.

According to one embodiment, said polymer matrix (a) and said oligomer(s) (b) are used in the composition in a weight ratio (b)/(a) ranging from 0.01 to 0.15, preferably from 0.025 to 0.15, in particular from 0.03 to 0.1.

It is up to those skilled in the art to adjust the content of plasticizer in the composition. If it is not incorporated in a sufficient amount, then it does not make it possible to correctly decrease the viscosity of the thermoplastic polymer. On the other hand, above a certain amount, the polymer matrix is saturated and degradation of some properties may be observed.

When the amount of oligomer is too high, phase separation may even occur in the polymer. Consequently, the upper limit, that is to say the critical threshold not to be exceeded with regard to the proportions of oligomer, must be less than the amount which causes this phase separation. Thus, in the particular case of cyclized poly(butylene terephthalate) such as the CBT 100 resin for example, the proportions of oligomer in the composition according to the invention are preferably less than 15% by weight, and they are more preferably between 3% and 8% by weight, which is sufficient to obtain the expected reduction in viscosity and the preservation of the physical (mechanical) properties of the thermoplastic polymer matrix and of the interface with the impregnated fibrous material.

Phenolic Polymer

As previously mentioned, the thermoplastic composition of the invention comprises at least one antiplasticizer of phenolic polymer type.

Such an agent advantageously makes it possible to reduce the moisture sensitivity of the thermoplastic polymer matrix by a reduction in the water uptake kinetics, and to substantially increase its glass transition temperature (Tg) without altering its melting point (Mp).

Preferably, this phenolic polymer is selected from novolac resins.

Blends of phenolic polymers according to the invention may in particular be used for preparing the composition according to the invention. In particular, the composition according to the invention may comprise one or several different types of novolac resins.

The novolac resins are generally compounds of polyhydroxyphenol type, for example products of condensation of phenolic compounds with aldehydes, ketones or derivatives thereof, for instance ketals or hemiketals. These condensation reactions are generally catalyzed by an acid or a base.

The novolac resins generally have a degree of condensation ranging from 2 to 15.

The phenolic compounds may be selected, alone or as mixtures, from phenol, cresol, xylenol, naphthol, alkylphenols, such as butylphenol, tert-butylphenol or isooctylphenol, nitrophenol, phenylphenol, resorcinol or bisphenol A; or any other substituted phenol.

The aldehyde most frequently used is formaldehyde. However, use may be made of other aldehydes, such as acetaldehyde, paraformaldehyde, butyraldehyde, crotonaldehyde, glyoxal and furfural.

Use may be made, as ketone, of acetone, methyl ethyl ketone, or acetophenone.

According to one particular embodiment of the invention, the phenolic polymer is a condensation product of phenol and formaldehyde.

The novolac resins used advantageously have a molecular weight of between 500 and 3000 g/mol, preferably between 800 and 2000 g/mol.

Mention may in particular be made, as commercial novolac resin, of the commercial products Durez®, Vulkadur® or Rhenosin®.

According to one embodiment of the invention, the phenolic polymer comprises at least units of formula (I) below:

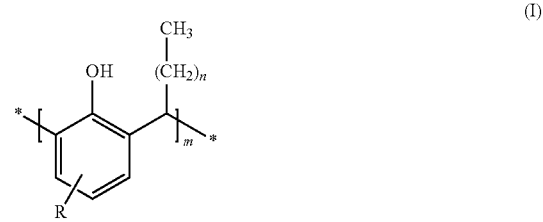

(I)

wherein R represents a hydrogen atom or a linear or branched alkyl group comprising from 1 to 20 carbon atoms optionally comprising heteroatoms, m is between 6 and 15, and n is between 5 and 22.

Preferentially, the linear or branched alkyl group comprises from 1 to 10 carbon atoms. Preferentially, the heteroatoms are oxygen or nitrogen. R is more preferentially a hydrogen atom, a methyl, an ethyl, a propyl, a butyl or an octyl, m is more preferentially between 8 and 12, and may in particular take the values 8, 9, 10, 11 or 12, or any interval included between these values, and n is more preferentially between 10 and 15, in particular the values 10, 11, 12, 13, 14 or 15, or any interval included between these values.

The phenolic polymer of the invention may also be a polymer comprising at least units of formula (I) and also units of formula (II) below:

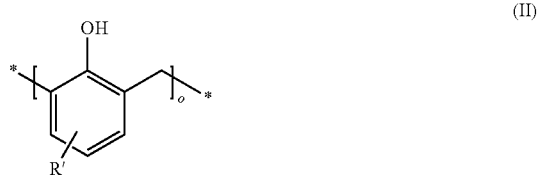

(II)

wherein R' represents a hydrogen atom or a linear or branched alkyl group comprising from 1 to 20 carbon atoms optionally comprising heteroatoms, and o is between 6 and 15. R and R' may be independent of one another, or equivalent. o may take in particular the values 6, 7, 8, 9, 10, 11, 12, 13, 14 or 15 or any interval included between these values.

This compound may in particular then be a random polymer.

The polymeric phenolic compound of the invention comprising at least units represented by formula (I) and optionally units represented by formula (II) may be produced in various ways. The processes conventionally used to produce novolac resins may in particular be used.

Preferably, the phenolic polymer(s) are present in the composition according to the invention in a content ranging from 1% to 15% by weight, preferably from 2% to 12% by weight and preferably from 4% to 10% by weight, relative to the total weight of the composition.

According to one embodiment, said polymer matrix (a) and said phenolic polymer(s) (c) are used in the composition in a weight ratio (c)/(a) ranging from 0.01 to 0.20, preferably from 0.02 to 0.17, in particular from 0.04 to 0.15.

It is up to those skilled in the art to adjust the content of antiplasticizer in the composition. If it is not incorporated in a sufficient amount, then it does not make it possible to correctly decrease the viscosity of the thermoplastic polymer. On the other hand, above a certain amount, the polymer matrix is saturated and the phenolic polymer tends to bleed/migrate out of the parts produced with the composition of the invention. In the context of the production of a composite article with a composition in accordance with the invention, the excess phenolic polymer may have a negative effect at the level of the fiber-matrix interfaces.

Composition

The composition according to the invention advantageously comprises:

(a) from 80% to 99.8% by weight of thermoplastic polymer matrix, in particular of polyamide(s);

(b) from 0.1% to 10% by weight of cyclic ester oligomer(s), of ether oligomer(s) or of a mixture or mixtures thereof, in particular of cyclized poly(butylene terephthalate); and (c) from 0.1% to 12% by weight of phenolic polymer(s), and in particular of novolac resin(s).

Preferably, it comprises:

(a) from 80% to 98% by weight of thermoplastic polymer matrix, in particular of polyamide(s);

(b) from 1% to 8% by weight of cyclic ester oligomer(s), of ether oligomer(s) or of a mixture or mixtures thereof, and in particular of cyclized poly(butylene terephthalate); and (c) from 1% to 12% by weight of phenolic polymer(s), in particular of novolac resin(s).

In particular, it comprises:

(a) from 80% to 92% by weight of thermoplastic polymer matrix, in particular of polyamide(s);

(b) from 3% to 8% by weight of cyclic ester oligomer(s), of ether oligomer(s) or of a mixture or mixtures thereof, and in particular of cyclized poly(butylene terephthalate); and (c) from 5% to 12% by weight of phenolic polymer(s), and in particular of novolac resin(s).

Advantageously, the composition according to the invention has, in the molten state, a viscosity of less than 75 Pa·s and preferably less than 50 Pa·s, or even less than or equal to 20 Pa·s.

The thermoplastic composition having high fluidity in the molten state according to the invention may also comprise all the additives normally used in thermoplastic polymer-based compositions and in particular used in the process for producing composites.

Thus, by way of example of additives, mention may be made of heat stabilizers, plasticizers, antioxidants, lubricants, pigments, dyes, reinforcing fillers, impact-resistance modifiers, nucleating agents, catalysts, light and/or heat stabilizers, antistatics, matting agents, processing aids for molding, and other conventional additives.

With regard more particularly to the impact-resistance modifiers, they are generally elastomer polymers. The toughness modifiers are generally defined as having an ASTM D-638 tensile modulus of less than about 500 MPa. Examples of suitable elastomers are ethylene/acrylic ester/ maleic anhydride products, ethylene/propylene/maleic anhydride products or ethylene/propylene/diene monomer products (EPDMs) with optionally a grafted maleic anhydride. The weight concentration of elastomer is advantageously between 0.1% and 30% relative to the total weight of the composition.

Preference is given in particular to impact modifiers comprising functional groups that are reactive with the thermoplastic polymers, in particular with the polyamides. Mention may be made, for example, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene/maleimide copolymers grafted with maleic anhydride, styrene/ethylene/butylene/styrene copolymers modified with maleic anhydride, styrene/acrylonitrile copolymers grafted with maleic anhydrides, acrylonitrile/butadiene/styrene copolymers grafted with maleic anhydrides, and the hydrogenated versions thereof. Mention may also be made of agents of (stress relief) silicone elastomer type. The weight proportion of these modifiers in the total composition is in particular between 0.1% and 40%.

Additives for improving the quality of the thermoplastic polymer reinforcing fabric interfaces may also be used. These additives may for example be incorporated into the composition.

Such additives may for example be coupling agents, such as those of aminosilane or chlorosilane type, or liquefying or wetting agents, or their combination.

Reinforcing fillers may be incorporated into the thermoplastic composition. These fillers may be selected from fibrous fillers, such as short glass fibers, for example, or non-fibrous fillers, such as kaolin, talc, silica, mica or wollastonite. Their size is generally between 0.5 and 10 μm. Submicronic, indeed even nanometric, fillers may also be used, alone or supplementing the other fillers.

These fillers and additives may be added to the composition by the usual means appropriate to each filler or additive, such as, for example, during polymerization or in melt-blending.

The compositions of the invention are generally obtained by mixing the various constituents with heating, for example in a single-screw or twin-screw extruder, at a temperature sufficient to maintain the thermoplastic matrix in molten medium; or under cold conditions, in a mechanical mixer in particular. Generally, the blend obtained is extruded in the form of rods which are cut into pieces in order to form granules. The constituents of the composition may be added in any order. The addition of the oligomer(s), of the phenolic polymer(s) and of the optional additives may be carried out by adding these compounds to the molten thermoplastic matrix.

Process

As emerges from the aforementioned, according to one of its aspects, the present invention concerns a process for producing a composite article, comprising at least one step of impregnating a reinforcing fabric with a composition according to the invention in the molten state.

The term "fabric" is intended to mean a textile surface of yarns or fibers which are optionally rendered integral by any process, such as, in particular, adhesive bonding, felting, braiding, weaving or knitting. These fabrics are also denoted as fibrous or filamentary networks.

The term "yarn" is intended to mean a monofilament, a continuous multifilament yarn or a staple yarn obtained from fibers of a single type or from several types of fibers as an intimate mixture. The continuous yarn may also be obtained by assembling several multifilament yarns.

The term "fiber" is intended mean a filament or a combination of filaments which are cut, cracked or converted.

The reinforcing yarns and/or fibers according to the invention are preferably selected from yarns and/or fibers formed of carbon, glass, aramids, polyimides, flax, hemp, sisal, coir, jute, kenaf and/or a mixture thereof.

More preferably, the reinforcing fabrics are composed solely of reinforcing yarns and/or fibers selected from yarns and/or fibers formed of carbon, glass, aramids, polyimides, flax, hemp, sisal, coir, jute, kenaf and/or a mixture thereof.

These fabrics preferably have a grammage, that is to say weight per square meter, of between 100 and 1500 g/m$^2$, preferably between 100 and 1000 g/m$^2$.

Their structure may be random, unidirectional (UD) or multidirectional (2D, 2.5D, 3D or other).

A composite article obtained by means of the process according to the invention may comprise several reinforcing fabrics which may or may not be of different nature.

The step of impregnating the thermoplastic composition of the invention and the reinforcing fabric may be carried out in various ways, according to various possible processes. It is perfectly possible to perform impregnation of one or more reinforcing fabric(s).

By way of example of processes that are suitable for use in the present invention, mention may particularly be made of molding processes, like injection-molding, pultrusion, for instance pultrusion-injection, rotary molding, sintering, casting, extrusion, such as extrusion/blow-molding, or else co-molding processes.

Processes which directly use the resin (molten polymer) and the reinforcement, such as injection molding (LCM) and pultrusion molding, in particular injection molding, are particularly preferred.

By way of injection molding process, mention may for example be made of the resin transfer molding (RTM) process. This process comprises injecting the molten thermoplastic composition into a closed mold comprising at least one or more reinforcing fabrics. The inside of the mold may be at a temperature of plus or minus 50° C. relative to the melting point of the thermoplastic composition. The mold and the article obtained may then be cooled so as to finally recover said article. This process may be carried out under pressure.

A variant of this process, known as the C-RTM process, also known as compression injection molding, may also be used in the present invention. It differs from the RTM process in that the gap of the mold is slightly open during the injection of the composition in the molten state. The part is then consolidated and adjusted to size by closing the mold.

After the impregnation of the reinforcing fabric with the polyamide, the article is obtained by solidification of the matrix. The cooling may advantageously be carried out rapidly, so as to prevent significant crystallization of the polyamide, in particular in order to maintain the properties of the article. The cooling may in particular be carried out in less than 5 minutes, more preferentially in less than one minute. The mold may for example be cooled by means of a cold fluid circuit. The composite article may also optionally be transferred into a cold mold, optionally under pressure.

As mentioned above, the composite article of the invention may also be produced by pultrusion.

Advantageously, the process used is a pultrusion process, preferably by injection, then known as pultrusion-injection process.

The pultrusion technique consists in drawing through a heated die one or more continuous yarns and fibers in such a way as to impregnate them with a molten thermoplastic resin so as to obtain a finished or semi-finished rod or article.

In the pultrusion-injection process, the molten polymer is injected at the level of the heated die for the purposes of impregnating the reinforcing fabric also introduced into this die.

The hot-press film stacking process followed by a forming step such as stamping, with optionally a final overmolding step, is also a process which may advantageously use the claimed composition.

Article

The present invention also concerns an article capable of being obtained by means of the process of the invention. The article may in particular be a polyamide-based composite article comprising a reinforcing fabric.

The articles according to the invention preferentially comprise between 25% and 70% by volume, in particular between 45% and 67% by volume, of reinforcing fabric relative to the total volume. The composite articles preferentially have, for a degree of reinforcement of 50% by volume, a tensile strength greater than 450 MPa and an elastic modulus greater than 20 GPa (for a void content typically between 0 and 2%).

The articles of the invention may be finished articles, or semi-finished articles that may also be called pre-pregs. It is possible, for example, to carry out the thermoforming of the composite articles in the form of sheets in order to give them a defined shape after cooling. The invention thus concerns composite articles capable of being obtained by means of the process according to the present invention.

The articles of the invention may in particular be profiled, when the production process used is a pultrusion process.

The articles of the invention may also be structures of sandwich type exhibiting a kernel inserted between two skins. The composites of the invention may be used to form external layers, by combining them with a kernel of honeycomb type or foam type. The layers may be assembled by chemical or heat bonding. The composite structures according to the invention may be employed in numerous fields, such as the aeronautical, motor vehicle and energy fields and the electrical and sports and leisure industries. These structures may be used to produce sports equipment, such as skis, or else to produce various surfaces, such as special floors, partitions, vehicle bodies or billboards. In aeronautics, these structures are used in particular for fairings (fuselage, wing, tailplane). In the motor vehicle industry, they are used for example for floors, supports such as front or rear blocks, or else structural parts.

In the description and in the examples which follow, unless otherwise indicated, the percentages are percentages by weight and the ranges of values given in the form "between . . . and . . . " include the upper and lower limits specified.

The examples which follow are presented by way of illustration and without limitation of the field of the invention.

EXAMPLES

Example 1

Thermoplastic Compositions

Several compositions in accordance with the invention or outside the invention, based on polyamide PA66 22FE1 sold by Solvay under the name Stabamid, are prepared.

Thermoplastic polymer: the molecular weight is obtained by measurement using gel permeation chromatography (GPC), also known as size exclusion chromatography (SEC).

In the case of the polyamides, the GPC measurements of the PA6 and PA66 are carried out in dichloromethane (solvent and eluent), after chemical modification of the PA in order to solubilize it. A UV detector is used because the chemically modified PA has a UV chromophore. The calculation of the distribution of weights and also the average weights Mn and Mw is carried out in polystyrene equivalents after calibration using commercial standards. Absolute-weight measurements are carried out by viscometric detection. Mn and Mw values may be calculated from the entire distribution or after truncation of the low weights if it is not desired to take into account the contribution of the oligomers.

The polyamide of control composition (PA66 22FE1) has a melting point of 260° C. Its melt viscosity is measured according to the protocol previously detailed by means of a Rheometrics RDA3 rheometer (rheometer comprising a cone-plate device, 25 mm in diameter) at a temperature of 280° C., and is 70 Pa·s.

The various compositions prepared all comprise polyamide PA66 22FE1, and either novolac resin (Rhenosin RB sold by the company Rhein Chemie) or cyclized poly (butylene terephthalate) (CBT 100 sold by Cyclics Corporation), or both, in the weight contents indicated in the table below. These compositions are obtained by melt-blending of the various constituents by extrusion using a Prism 25D twin-screw extruder. The rods coming out of the extruder are run into a water cooling tank and subsequently granulated.

The viscosity is then measured in the same way as for the polyamide PA66 22FE1 alone (control).

The results obtained are shown in table 1 below.

TABLE 1

|  | PA66 22FE1 (% by weight) | CBT resin (% by weight) | Novolac (% by weight) | Viscosity at 10 Hz 280° C. (Pa · s) |
|---|---|---|---|---|
| Control | 100 | 0 | 0 | 68 |
| Composition 1 (outside the invention) | 94 | 0 | 6 | 42 |
| Composition 2 (outside the invention) | 90 | 0 | 10 | 35 |
| Composition 3 (outside the invention) | 96 | 4 | 0 | 25 |
| Composition 4 (outside the invention) | 80 | 20 | 0 | 45 |
| Composition 5 (in accordance) | 90 | 4 | 6 | 20 |
| Composition 6 (in accordance) | 86 | 4 | 10 | 15 |
| Composition 7 (in accordance) | 88 | 6 | 6 | 12 |
| Composition 8 (in accordance) | 80 | 8 | 12 | 10 |

These results underline that the combined use of a plasticizer and of an antiplasticizer according to the invention in an antiplasticizer/plasticizer weight ratio in accordance with the invention makes it possible to very significantly reduce the melt viscosity of thermoplastic polymers such as PA66, thus promoting the impregnation of fibrous reinforcements with these compositions in the molten state.

The stability of the melt viscosity of the compositions obtained is evaluated through the melt viscosity values measured at t=0 min, t=10 min and t=15 minutes at a temperature of 280° C. (molten state).

The results obtained are shown in table 2 below.

TABLE 2

Stability of the Viscosity at 280° C. Measurement at 10 Hz as a function of time (0 -> 15 min)

|  | Viscosity at $t_0$ (Pa · s) | Viscosity at $t_{5\ min}$ (Pa · s) | Viscosity at $t_{10\ min}$ (Pa · s) | Viscosity at $t_{15\ min}$ (Pa · s) |
|---|---|---|---|---|
| Control | 55 | 60 | 62 | 65 |
| Composition 1 (outside the invention) | 38 | 40 | 42 | 43 |
| Composition 2 (outside the invention) | 32 | 34 | 35 | 35 |
| Composition 3 (outside the invention) | 29 | 26 | 25 | 23 |
| Composition 4 (outside the invention) | 35 | 40 | 45 | 43 |
| Composition 5 (in accordance) | 22 | 21 | 20 | 20 |
| Composition 6 (in accordance) | 18 | 16 | 15 | 15 |
| Composition 7 (in accordance) | 18 | 17 | 12 | 12 |
| Composition 8 (in accordance) | 19 | 15 | 10 | 10 |

This table shows that, in addition to allowing a significant reduction in the melt viscosity of thermoplastic polymers such as PA66, the compositions according to the invention have a melt viscosity which is stable or which slightly decreases over time, thereby also promoting the impregnation of fibrous reinforcements with these compositions in the molten state. On the other hand, the melt viscosity of the compositions outside the invention instead has a tendency to increase over time.

It should be noted that the addition of these compounds to the polyamide PA66 22FE1 has no effect on its glass transition temperature Tg or on its melting point Mp, when the cumulative content of plasticizer and antiplasticizer is less than 12%.

Example 2

Preparation of a Composite

The thermoplastic composition 5 of the previous example is used in this example for the preparation of a composite.

The reinforcing fabric used is an 8-harness satin glass fiber fabric having a grammage of 500 g/m².

The thermoplastic composition in question is used in the form of granules or powder (low-viscosity polymer).

The powders are obtained by cryogenic milling, either in dry ice, or in liquid nitrogen, and are then dried (RH=0) for 12 h at 110° C. under vacuum.

Composite parts are prepared using a Schwabenthan (Polystat 300A) hydraulic press comprising two temperature-controlled plates: heating plates (heating resistances) and cooled plates (circulation of water). A metal mold having a cavity with dimensions of 150 mm×150 mm or 200×300 mm is used.

To produce a composite containing 60% by volume of glass fibers with the fabric having a grammage of 500 g/m², introduced between the plates is a metal frame into which is placed a preform consisting of an alternating stack comprising 6 glass fabric sheets and uniformly distributed powder between each, the two external layers being glass fabric sheets.

The temperature of the plates of the press is increased beforehand to 275° C. (in the case of PA66) before introduction of the preform. At this temperature, the pressure is applied between 1 and 25 bar and maintained at this value; degassing operations may optionally be rapidly performed. The assembly is kept at the same temperature and pressure, without degassing, for a period of time sufficient to have good impregnation (stabilization of the pressure and of the distance between plates). The mold is then transferred onto the cooled-plate device and maintained at a pressure between 1 and 5 bar for a period of less than 5 minutes.

The cycle time is greater than 20 minutes for viscosities above 250 Pa·s; it is reduced to approximately 10 minutes for viscosities between 200 and 700 Pa·s; finally, for low viscosities (less than 50 Pa·s), the cycle time becomes less than 5 minutes and the pressure may be notably decreased (less than 5 bar).

The composite parts thus obtained have a size of 150×150 mm or 200×300 mm and a thickness of approximately 2 mm.

The plasticizer/antiplasticizer combination provides the polyamide with excellent hot-wettability on fabric. This makes it possible to obtain a good level of interfacial cohesion between the polymer and the fibers of the reinforcement.

The very low viscosity of the thermoplastic compositions according to the invention thus allows excellent consolidation (void content: 0.1%) for a fiber content by volume of 60% and a short cycle time (less than 5 minutes). Thus, an overall cycle of 30 minutes may comprise 15 minutes of heating/5 minutes of temperature hold (T>Mp) and 10 min of cooling. The void content is measured by weighing (ASTM standard D2734-94), and optionally verified by observation using scanning electron microscopy (SEM) for low contents.

The cycle time corresponds to the total duration between the bringing of the mold to temperature and the cooling under pressure.

The invention claimed is:

1. A thermoplastic composition having high fluidity in molten state, comprising at least:

(a) from 80 to 99.8% by weight of a thermoplastic polymer matrix comprising at least one polyamide;
(b) from 0.1 to 10% by weight of at least one cyclic polyester oligomer, said oligomer having a degree of polymerization of between 2 and 25, wherein said cyclic polyester oligomer is cyclized poly(butylene terephthalate); and
(c) from 0.1 to 12% by weight of at least one phenolic polymer;
said compounds (b) and (c) being present in a weight ratio (c)/(b) varying from 0.25 to 6.

2. The composition as claimed in claim 1, wherein said polyamide is selected from polyamides obtained by polycondensation of at least one aliphatic dicarboxylic acid with an aliphatic or cyclic diamine, polyamides obtained by polycondensation of at least one aromatic dicarboxylic acid and an aliphatic or aromatic diamine, polyamides obtained by polycondensation of at least one amino acid or lactam with itself, or blends thereof and (co)polyamides.

3. The composition as claimed in claim 1, said at least one polyamide comprising hydroxyaromatic units chemically bonded to the chain of the polyamide.

4. The composition as claimed in claim 1, said at least one polyamide having a weight-average molecular weight Mw of between 10 000 and 50 000 g/mol.

5. The composition as claimed in claim 1, said at least one polyamide being selected from PA 66, PA 6.10, PA 6.12, PA 12.12, PA 4.6, MXD 6, PA 6, PA 7, PA 9T, PA 10T, PA 11, PA 12, PA 6T/6I, PA 6T/6I/66, copolyamides deriving therefrom, and blends thereof.

6. The composition as claimed in claim 1, wherein said at least one cyclic polyester oligomer has a melting point Mp lower than or equal to that of the thermoplastic polymer matrix.

7. The composition as claimed in claim 1, said at least one phenolic polymer being a product of condensation of phenol and formaldehyde.

8. The composition as claimed in claim 1, said at least one phenolic polymer comprising units of formula (I) below:

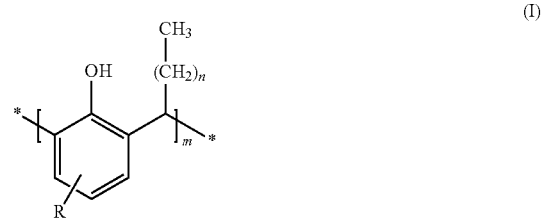

wherein R represents a hydrogen atom or a linear or branched alkyl group comprising from 1 to 20 carbon atoms optionally comprising heteroatoms, m is between 6 and 15, and n is between 5 and 22.

9. The composition as claimed in claim 1, having, in the molten state, a viscosity of less than 75 Pa·s.

10. A process for producing a composite article comprising at least one step of impregnating a reinforcing fabric or a preform with a composition as claimed in claim 1 in the molten state.

11. The process as claimed in claim 10, characterized in that it is a pultrusion process by direct injection, or an RTM process by closed-molding injection.

12. A composite article obtained by means of the process as claimed in claim 10.

* * * * *